US012008711B2

United States Patent
Aleem et al.

(10) Patent No.: US 12,008,711 B2
(45) Date of Patent: Jun. 11, 2024

(54) DETERMINING DISPLAY GAZABILITY AND PLACEMENT OF VIRTUAL TRY-ON GLASSES USING OPTOMETRIC MEASUREMENTS

(71) Applicant: Google LLC, Mountain View, CA (US)

(72) Inventors: Idris Syed Aleem, Kitchener (CA); Rees Anwyl Samuel Simmons, Waterloo (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/650,453

(22) Filed: Feb. 9, 2022

(65) Prior Publication Data
US 2023/0252721 A1 Aug. 10, 2023

(51) Int. Cl.
G09G 3/10 (2006.01)
G06T 7/70 (2017.01)
G06T 17/00 (2006.01)

(52) U.S. Cl.
CPC .......... *G06T 17/00* (2013.01); *G06T 7/70* (2017.01); *G06T 2207/30201* (2013.01)

(58) Field of Classification Search
CPC ... G06T 7/62; G06T 7/74; G06T 2207/30204; G06T 2207/30208; G06T 2207/30201; G06T 2207/30196; G06T 7/73; G06T 7/11; G06T 7/70; G06T 7/00; G06V 40/165; G06Q 30/0643
USPC ......................................... 345/41
See application file for complete search history.

(56) References Cited

U.S. PATENT DOCUMENTS

| 11,112,611 | B1 | 9/2021 | Kessler et al. |
| 2003/0123026 | A1* | 7/2003 | Abitbol ............. G06Q 30/0641 351/204 |
| 2015/0293382 | A1 | 10/2015 | Jethmalani et al. |
| 2019/0108687 | A1 | 4/2019 | Kelly et al. |
| 2021/0026445 | A1 | 1/2021 | Stoner |
| 2021/0049830 | A1 | 2/2021 | Goldberg et al. |
| 2021/0065285 | A1 | 3/2021 | Goldberg et al. |
| 2021/0088811 | A1 | 3/2021 | Varady et al. |
| 2021/0264684 | A1* | 8/2021 | Mercer .................... G06T 7/55 |

(Continued)

FOREIGN PATENT DOCUMENTS

EP 3339943 A1 6/2018

OTHER PUBLICATIONS

International Search Report and Written Opinion for PCT Application No. PCT/US2023/060323, dated May 30, 2023, 14 pages.

(Continued)

*Primary Examiner* — Jennifer T Nguyen
(74) *Attorney, Agent, or Firm* — Brake Hughes Bellermann LLP

(57) ABSTRACT

A method includes receiving a face image and lens measurements of a person, and selecting a three dimensional (3-D) model of a frame of a pair of smart glasses from a plurality of 3-D models of frames for placement on the face image of the person. The pair of smart glasses includes a virtual display embedded in, or overlaid on a lens. The method further includes sizing the selected 3-D model of the frame of the pair of smart glasses for placement on the face image of person based on the lens measurements of the person, and determining a gazability of the virtual display in the 3-D model of the pair of smart glasses placed on the face image of the person.

22 Claims, 9 Drawing Sheets

(56) References Cited

U.S. PATENT DOCUMENTS

2021/0327148 A1* 10/2021 Goldberg ................. G06T 7/73
2022/0405500 A1* 12/2022 Bhargava ............... G06T 17/00

OTHER PUBLICATIONS

Singer, et al., "Tackling the Challenges of Fully Immersive Head-Mounted AR Devices", Proc. of SPIE-OSA/vol. 10590, 2017, pp. 1059018-1-1059018-12.
Wu, et al., "Image Adaptation to Human Vision (Eyeglasses Free): Full Visual-Corrected Function in Light-Field Near-to-Eye Displays", SID 2021 Digest, 2021, pp. 1143-1145.

* cited by examiner

200B

200C

650

DETERMINING DISPLAY GAZABILITY AND PLACEMENT OF VIRTUAL TRY-ON GLASSES USING OPTOMETRIC MEASUREMENTS

FIELD

This description relates to image processing in a context of sizing of glasses for a person, and in particular in the context of remotely fitting the glasses to the person.

BACKGROUND

Eyewear (i.e., glasses, also known as eyeglasses or spectacles) are vision aids, consisting of glass or hard plastic lenses mounted in a frame that holds them in front of a person's eyes, typically utilizing a nose bridge over the nose, and legs (known as temples or temple pieces) which rest over the ears. The resting positions of the temple pieces over the ears (e.g., on ear apex or ear saddle points (ESPs))) of the person can define the tilt and width of the glasses and determine both the display and comfort. Smart glasses are glasses that add information displayed on a virtual display ("smart display") alongside what the wearer sees through the glasses.

Virtual try-on (VTO) technology can let users try on different pairs of glasses, for example, on a virtual mirror on a computer, before deciding which glasses look or feel right. A VTO system may display trial virtual pairs of glasses positioned on a model of the person's face in computer images (e.g., images on a smart phone) that the person can inspect, for example, for cosmetic appearance, as the person turns or tilts his or her head from side to side.

However, while a traditional VTO system may help choose which trial virtual pair of glasses look good on the person's face, the traditional VTO system may provide no information, for example, on where the glasses sit on the person's nose bridge or on the viewability (i.e., gazability) of information added on a smart display alongside what the person sees through smart glasses.

SUMMARY

In a general aspect, an image processing system includes a processor and a memory. The processor is configured to execute instructions stored in memory to receive from an image capture device a face image of a person, receive lens measurements of the person, and select a 3-D model of a frame of a pair of smart glasses from a plurality of 3-D models of frames for placement on the face image of the person, the pair of smart glasses including a virtual display embedded in, or overlaid on a lens. The processor is further configured to execute instructions stored in memory to size the selected 3-D model of the frame of the pair of smart glasses for placement on the face image of the person based on the lens measurements of the person, and determine a gazability of the virtual display in the 3-D model of the pair of smart glasses placed on the face image of the person.

In a general aspect, a method includes receiving a face image and lens measurements of a person, and selecting a three dimensional (3-D) model of a frame of a pair of smart glasses from a plurality of 3-D models of frames for placement on the face image of the person. The pair of smart glasses includes a virtual display embedded in, or overlaid on a lens. The method further includes sizing the selected 3-D model of the frame of the pair of smart glasses for placement on the face image of person based on the lens measurements of the person, and determining a gazability of the virtual display in the 3-D model of the pair of smart glasses placed on the face image of the person.

In a general aspect, a system includes a processor and a memory. The processor is configured to execute instructions stored in memory to: receive a front-view face image and a side-view face image of a person, receive lens measurements of the person and size a frame of a pair of glasses for placement on the person based on the lens measurements of the person. The processor is further configured to execute instructions stored in memory to display the sized frame of the pair of glasses on the front-view face image, and display the sized frame of the pair of glasses on the side-view face image.

In a general aspect, a method includes receiving a front-view face image and a side-view face image of a person, receiving lens measurements of the person, and sizing a frame of a pair of glasses for placement on the person based on the lens measurements of the person. The method further includes displaying the sized frame of the pair of glasses on the front-view face image, and displaying the sized frame of the pair of glasses on the side-view face image.

BRIEF DESCRIPTION OF THE DRAWINGS

Example embodiments will become more fully understood from the detailed description herein and the accompanying drawings, wherein like elements are represented by like reference numerals, which are given by way of illustration only and thus are not limiting of the example embodiments.

Figure 1:
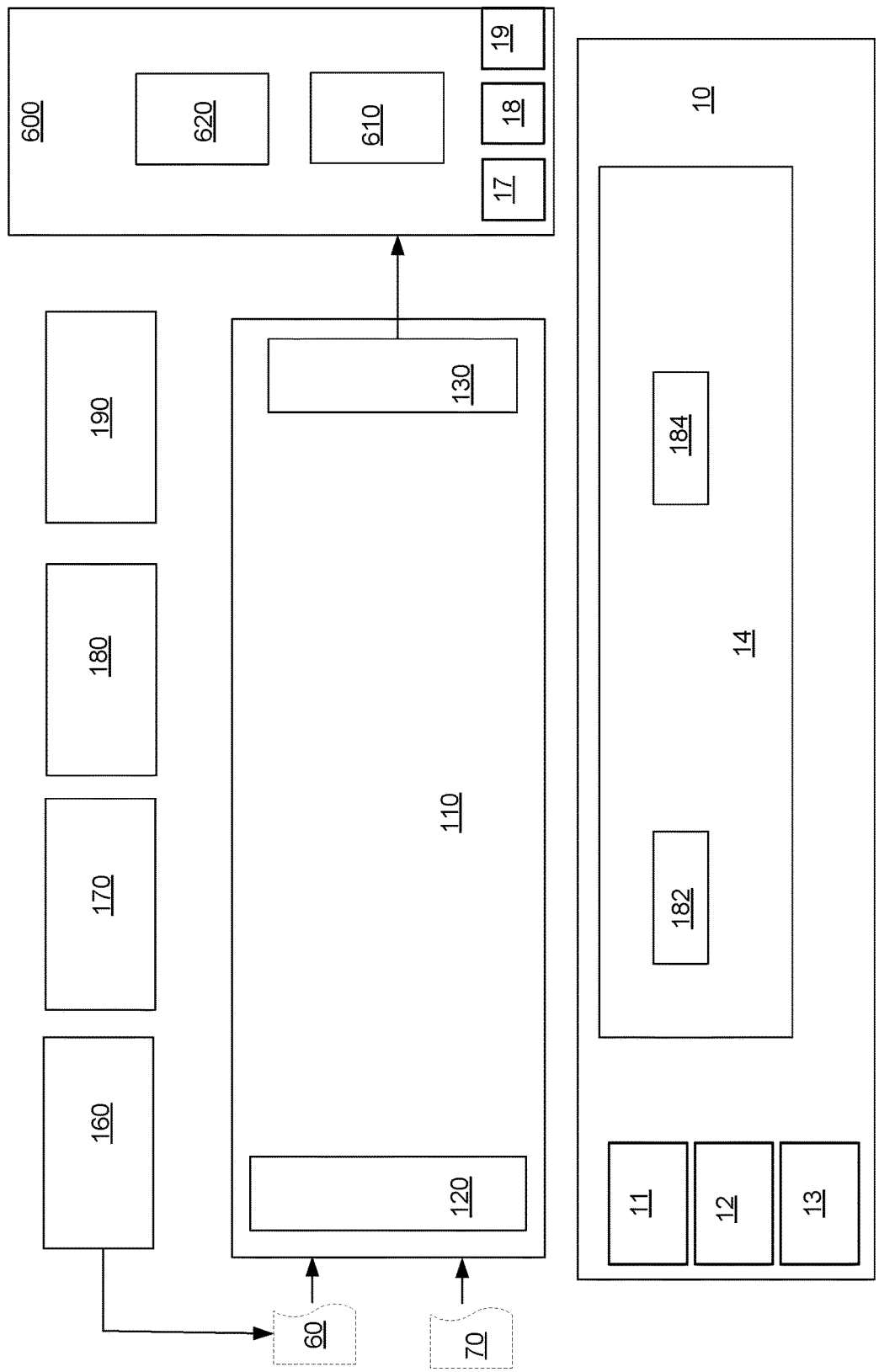
FIG. 1 is a block diagram schematically illustrating an example image and data processing system.

It should be noted that these FIGS. are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of components of the described eyeglasses may be reduced or exaggerated for clarity. The use of similar or identical reference numbers in the various drawings is intended to indicate the presence of a similar or identical element or feature.

DETAILED DESCRIPTION OF THE EMBODIMENTS

Systems and methods for sizing and determining placement of glasses on a person's face based on lens measurement data are described herein. The placement of glasses on the person's face may occur, for example, in a virtual try-on (VTO) session. In a further aspect, the disclosed systems and methods can determine the viewability (i.e., gazability) of a virtual display (smart display) in smart glasses placed on the person's face based on the lens measurement data.

Definitions of Terms

Generally, optometric measurement or lens measurements are angles and distances between features of the face and the glasses frames or lenses. Some of the optometric terms or lens measurement terms used in descriptions herein of fitting glasses or smart glasses to a person (and illustrated in the drawings) may be defined as follows:

Inter-pupillary distance (IPD)/left-pupillary distance (LPD)/right-pupillary distance (RPD)—The distance between the center of the person's eye pupils when staring towards the horizon, split into left and right PD based on the location of the person's nose bridge or the center of the glasses frame.

Left/Right pupil height—Vertical distance from the bottom of the left/right lens to the eye pupil as measured along the left/right lens, respectively.

Pantoscopic angle—Angle between the lens plane and gravity when the glasses are worn on the person's face.

Pantoscopic Tilt—Angle between the lens and the vertical axis of the person's face, which may be assumed to be in-line with gravity.

Left/Right vertex distance—Distance between the eye pupils and the left/right lenses.

Virtual or smart display—an electronic information display embedded or overlaid on a lens.

Output Coupler—Location of the virtual display on the lens.

Eye box—Three-dimensional volume extending from the lens towards the eye in which the virtual display embedded or overlaid on the lens is visible, Gazability—A metric describing a person's overall display visibility experience. In an example implementations, gazability may be defined as a percentage of a virtual display that can be seen (e.g., at maximum brightness at a fixed pupil size (small end) at the worst corner of the person's field of view (FOV)).

ArUco marker—An ArUco marker is a synthetic square marker composed of a wide black border and an inner binary matrix, which determines its identifier (id). ArUco markers placed in an image plane can be detected using a camera and can yield the three dimensional (3-D) pose of the image plane. In some implementations, other landmarks on the glasses can be used instead of ArUco markers or other fiducials can be used to determine the 3-D pose (i.e., position and orientation) of the image plane.

Sizing frames—Real glasses frames with ArUco markers placed on them. The frames need not include virtual or smart display technology.

Ear saddle point—Ear apex or point behind the ear where the temple pieces rest.

In physical settings (e.g., in an optometrist's office), eyeglasses (including the temple pieces) may be custom adjusted or sized to fit a particular person based on, for example, direct or indirect three-dimensional (3-D) anthropometric measurements of features of the person's head (e.g., eyes, nose, and ears). The fitting may intend to have an eyeglass frame hold the lenses in front of the person's face and eyes in a particular position and orientation. One or more optometric instruments (e.g., a phoropter, retinoscope, autorefractor, retinal camera, ophthalmoscope, or computerized vision screeners such as VT 1 Vision Screener or Optikam), sizing fames, and common distance measuring tools (e.g., rulers, calipers, measuring tapes, etc.) may be used for the optometric measurements. These measurements may be referred to herein as the "lens measurements."

The glasses may be of any type, including, for example, ordinary prescription or non-prescription glasses, sun glasses, smart glasses, augmented reality (AR) glasses, virtual reality (VR) glasses, and wearable heads-up displays (WHUDs), etc. Proper sizing of the eyewear (e.g., glasses) to fit a person's head requires consideration of the positions or locations of anatomical features (interpupillary distance, vertex, tilt of the person's head and alignment of the eyes, etc.) in three-dimensional (3-D) space.

In virtual settings, where the person is remote (e.g., on-line, or on the Internet), a virtual 3-D prototype of the glasses may be constructed after inferring the 3-D features of the person's head from a set of two-dimensional (2-D) images of the person's head. The glasses may be custom fitted by positioning the virtual 3-D prototype of the glasses on a 3-D head model of the person in a virtual-try-on (VTO) session (simulating an actual physical fitting of the glasses on the person's head). Proper sizing and accurate virtual-try-on (VTO) are important factors for successfully making custom fitted glasses for remote consumers.

In some virtual fitting situations, the ESPs of a remote person can be identified and located on the 2-D images using a sizing application (app) to process 2-D images (e.g., digital photographs or pictures) of the person's head. The sizing app may involve a machine learning model (e.g., a trained neural network model) to process the 2-D images to identify or locate the ESPs.

Smart glasses can have virtual image displays (hereinafter a "virtual display" or a "smart display") that can add information to what a wearer sees through the glasses. A smart display may be overlaid on, or embedded in, at least one of the pair of see-through lenses in the glasses.

The smart display may have an associated eye box (i.e., a volume in which the person's eye pupil(s) must be located for the person to see a full extent of the smart display. For a rectangular smart display, the eye box may, for example, be a trapezoidal-shaped frustum volume within which an eye pupil must be present to have a full view of the smart display.

A gaze metric (e.g., gazability) may characterize the viewability of a smart display based, for example, on criteria including the extent of the smart display that the person wearing the smart glasses is possibly able to see, and/or in which part of the eye box the person's eye pupil is located.

The systems and methods for sizing and determining placement of glasses on a person's face based on lens measurement data and/or determining the gazability of a smart display in smart glasses may be implemented in a computer-based image and data processing system. The system may, for example, combine the lens measurements with a frontal red-green-blue (RGB) image of a person's face, to produce an approximate virtual try-on of the glasses on the person's face. Further, the system may determine gazability by conducting mathematical operations based on the lens measurements to position the person's pupil position within the eye box, and then adjusting the gaze of the pupil to each corner of the display and determining how much of the display light is entering the pupil. In some implementations, the pupil's position within the eye box in a nominal gaze position can be used to predict display color uniformity, brightness, etc.

FIG. 1 is a block diagram schematically illustrating an example image and data processing system 100 that can size and determine placement of glasses on a person's face (e.g., in a VTO session) based on lens measurements of the person. System 100 may further be configured to determine gazability of the virtual display (smart display) in the smart glasses placed on the person's face based on lens measurements of the person.

System 100 may include an image and data processing pipeline 110 to analyze 2-D images and lens measurements data. Image and data processing pipeline 110 may be hosted on, or run on, a computer system configured to process, for example, the 2-D images.

The computer system may include one or more standalone or networked computers (e.g., computing device 10). An example computing device 10 may, for example, include an operating system (e.g., O/S 11), one or more processors (e.g., CPU 12), one or more memories or data stores (e.g., memory 13), etc.

Computing device 10 may, for example, be a server, a desktop computer, a notebook computer, a netbook computer, a tablet computer, a smartphone, or another mobile computing device, etc. Computing device 10 may be a physical machine or a virtual machine. While computing device 10 is shown in FIG. 1 as a standalone device, it will be understood that computing device 10 may be a single machine, or a plurality of networked machines (e.g., machines in public or private clouds).

Computing device 10 may host a sizing application (e.g., application 14) configured to process images and lens measurements data, for example, through image and data processing pipeline 110. A processor (e.g., CPU 12) in computing device 10 may be configured to execute instructions stored in the one or more memories or data stores (e.g., memory 13) to process the images and lens measurements data through the image and data processing pipeline 110 according to program code in application 14.

Image processing pipeline 110 may include an input stage 120 and an output stage 130. Input stage 120 may be configured to receive 2-D images (e.g., image 60) of a person's head. Image 60 may, for example, be a frontal RGB image of the person's face. The 2-D images may be captured using, for example, a smartphone camera or other camera (e.g., camera 160, camera 620). Input stage 120 may be further configured to receive lens measurement data (e.g., lens measurements 70) for the person from a lens measurement unit 170.

Image processing pipeline 110 may be coupled to, or include, a prototype frames library 180. Prototype frames library 180 may include 3-D models of glasses frames of various styles and sizes (or a listing of such 3-D models of glasses frames). Application 14 may be configured to process the images (e.g., image 60) and lens measurements data (e.g., lens measurement 70) for a person and select trial glasses frames (from prototype frames library 180) for example, for try-on by the person. In example implementations, application 14 may output the selected trial glasses frames (or identification of the selected trial glasses frames) to a virtual try-on system (e.g., VTO system 600) that may be coupled to output stage 130 of pipeline 110.

VTO system 600 may include a processor 17, a memory 18, a display 19, and a 3-D head model 610 of the person. 3-D head model 610 of the person's head may include 3-D representations or depictions of the person's facial features (e.g., eyes, ears, nose, etc.). The 3-D head model may be used, for example, as a mannequin or dummy, for placing glasses on the person in VTO sessions. In some implementations, VTO system 600 may include a camera 620 (or other imaging device) configured to capture live images (e.g., image 60) of the person. VTO system 600 may display images of trial or try-on glasses placed on the person's head, for example, on display 19 or other displays (including, e.g., a smartphone, or a personal computer display accessible to the person).

For sizing and determining placement of glasses on the person's face, the systems and methods may place of trial pairs of glasses on 2-D images (or 3-D models of) the person's face based on optometric measurements (lens measurements 70) of the person. The lens measurements can be made using one or more optometric instruments (e.g., pupilometers, etc.) or using, for example, sizing frames with ArUco markers. Some optometric instruments (e.g., an Optikam or an OpticamPad device (available from Optikam Tech Inc, 787 Rue de Liège O, Montréal, QC H3N 1B1, Canada), or the sizing frames) can directly output the optometric lens measurements (e.g., person's IPD, pupil heights, pantoscopic angle, vertex distance, etc.), for example, on a computer display (e.g., on an iPad).

A sizing simulator 190 included in system 100 (or in VTO system 600) may be configured to place the trial glasses frames on the person's 2-D head scan images or 3-D head models based on values of the lens measurement (e.g., lens measurements 70).

Figure 2A:
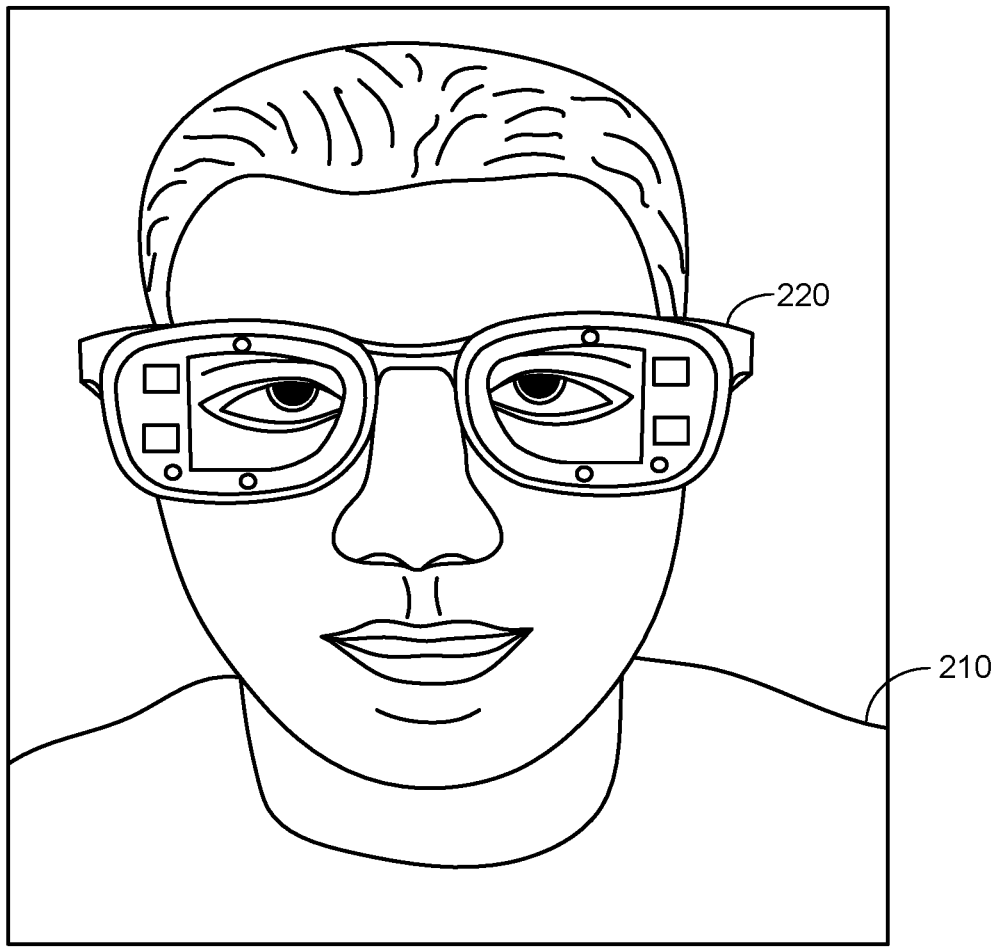
FIG. 2A illustrate an example frontal face image of a person.
Figure 2B:
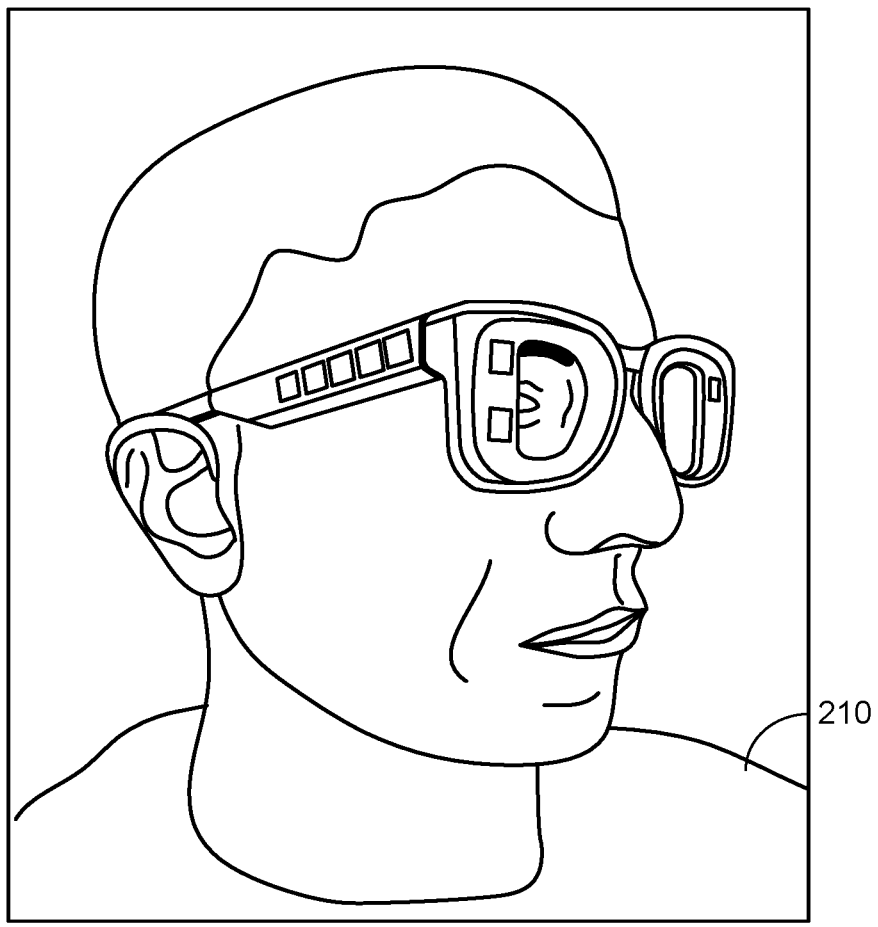
FIGS. 2B and 2C illustrate example non-frontal face images of the person.
Figure 2C:
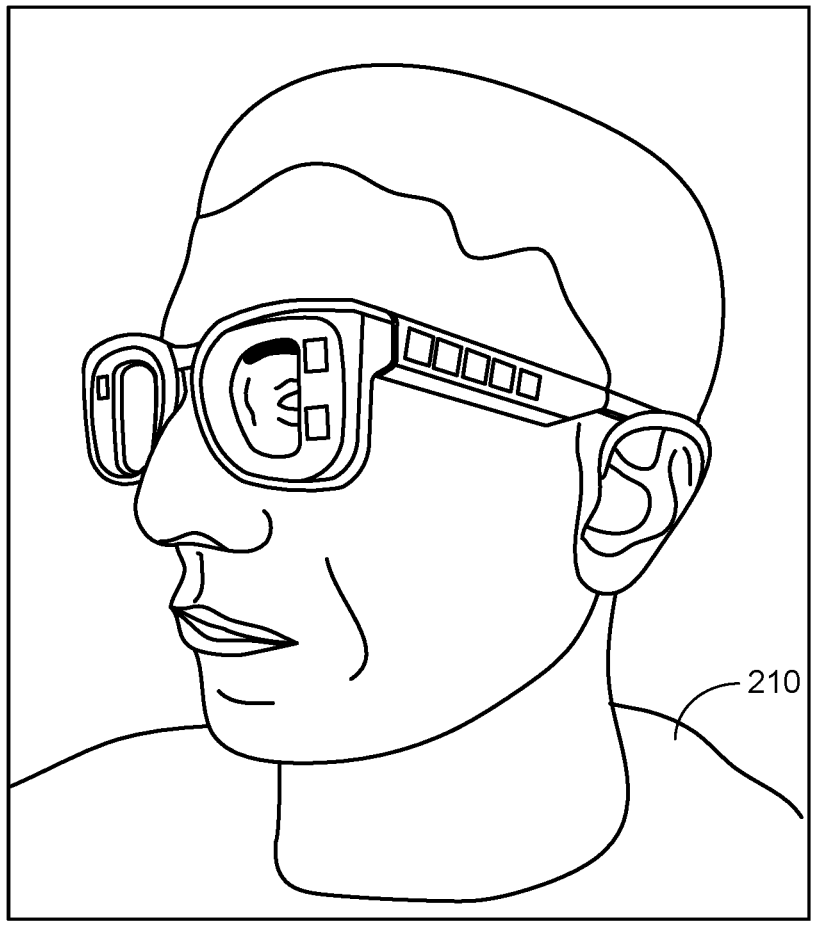

The lens measurements can be used in conjunction with a frontal image (e.g., a red-green-blue (RGB) image) of person's face to generate and place a prototype virtual try-on pair of glasses on the image of the person's face in the VTO system. FIG. 2A shows an example frontal face image 200A of a person 210 wearing glasses frame (e.g., glasses 220). FIGS. 2B and 2C show, for example, non-frontal images i.e., side-view images 200B and 200C of person 210 with head turned to the right and left, respectively.

The VTO system may be configured to empirically make virtual placement of glasses on images of the person based on the lens measurements. For example, if the pupil height within the lens is known, the glasses can be placed on an image of the person's face so that person's pupil in the image is at the same known height from the bottom of the glasses frame. Further, for example, the pantoscopic angle and face pose angles (e.g., known from lens measurements) may be used for proper placement of the glasses on images of the person. This VTO image of the person's face (including the placed glasses) (e.g., frontal face image 200A) may be used as a ground truth (since it is derived from the customer's lens measurements) for evaluating and improving capabilities of the VTO system.

In a further aspect, the disclosed systems and methods, for smart glasses, can determine the viewability (i.e., gazability) of the virtual display (smart display) in the smart glasses placed on the person's face (e.g., on a representation or image of the person's face).

Display Gazability based on Lens Measurements

As noted previously, lens measurements (pupil height, IPD, vertex distance, etc.) are standard measures commonly used across optometric practices for fitting a pair of glasses on a person's face. The lens measurements are also used to produce prescription lenses for the glasses. Using the lens measurements for determining gazability of the smart displays in smart glasses may unify different approaches for sizing glasses. The lens measurements can be determined by a simulator, via sizing frames, or via the Optikam devices or other optometric devices.

The viewability or gazability of a smart display in a pair of smart glasses as worn by a person may be determined based on lens measurements. The lens measurements may include, for example, measurements of one or more of the person's IPD, pupil height, pantoscopic angle, and vertex distance, etc. The viewability or gazability of the smart display may be described by a quantitative metric-gazability G, having a normalized value, for example, between 0 and 1. The value of gazability G may, for example, include a measure of the extent of a virtual display that a wearer of the smart glasses is able to see, and/or in which part of the eye box (e.g., eye box 440, FIG. 4) the wearer's eye pupil is located. In example implementations, gazability G may be determined by using mathematical algorithms to position an eye pupil within the eye box, then adjusting a gaze of the pupil to each corner of the smart display, and determining what percentage of the display light is entering the pupil at each corner of the smart display. In some example implementations, the position of the eye pupil within the eye box may be used to quantify color uniformity and brightness of the smart display.

In an example implementation, application 14 in system 100 (or in VTO system 600) may include an algorithm (gazability algorithm 184) for determining the gazability of a smart display in a pair of glasses positioned on the face of a person. Gazability algorithm 184 may determine gazability, for example, adjusting the gaze of the pupil to each corner of the virtual or smart display and determining how much of the display light is entering the pupil (i.e., determining what percentage of the display light is entering the pupil).

A determined gazability G value may be between 0 and 1. These 0 and 1 values may correspond, respectively, to no visibility, and full visibility of the smart display. In example implementations, the gazability may be determined only for the eye (e.g., a right eye) corresponding to the lens (e.g., a right lens) in which the smart display is embedded or overlaid.

In an example implementation, a data store may include a set of lens measurements that correlate with the positions of the glasses and the pupils. The lens measurements data may be based on image captures are done with the person properly aligned with an image capture device (e.g., a camera) (i.e., with the person's shoulders parallel with the camera image plane, and the person's head upright (as shown, e.g., in FIG. 2A), and not turned towards the left or right shoulder (as shown, example, e.g., in FIGS. 2B and 2C).

The lens measurements data may be used to create a FrameData prototype that can be fed into a data store or library (e.g., libgazability) (e.g., prototype frames library 180). An application programming interface (API) to the library may determine gazability (using, e.g., gazability algorithm 184) for given a pair of glasses based on a location of the output coupler (i.e., smart display) in the pair of glasses, and the location or gaze of a pupil (e.g., the right pupil).

In example implementations, to determine a FrameData prototype that can be fed into the data store or library (e.g., libgazability), a placement algorithm 182 (e.g., in application 14 or in system 600) may pre-select a frame size (e.g., MEDIUM_D.) of the pair of glasses for placement on the person, and then size the pair of glasses for placement on the person based on the lens measurements. Placement algorithm 182 may include initial steps to initially place the pair of glasses in 3-D space (e.g., on or aligned with a 3-D model of the person's head). The pair of glasses in 3-D space may be placed at a distance away from a camera (e.g. camera 620, or camera 160) capturing images of the person. The distance away from the camera may be an arbitrary number (e.g., 200 mm). The distance of 200 mm may correspond to a typical camera distance used for image capture.

Placement algorithm 182 may include a few initial steps to place the pair of glasses in 3-D space (e.g., on or aligned with a 3-D model of the person's head) at a distance away from a camera (e.g. camera 620, or camera 160, which may be a smart phone) capturing images (e.g., 2-D images) of the person.

The initial steps may include loading in a frame type; and rotating the glasses to have a same pantoscopic angle as the lens measurements as illustrated by the following example snippet of code:

Loads in the appropriate frame type
lens_measurement_frames=load_type(glasses_type)
lens_measurement_frames.set_origin(np.array([0, 0, 200]) #Place the glasses 200 mm from the camera
Rotates the glasses to have the same pantoscopic angle as the measurements
lens_measurement.set_orientation(X_rotation(pantosopic_angle))

With the rotation to the same pantoscopic angle as the measurements, the frame may be properly positioned for placement on the person's head.

The placement algorithm may further involve moving or adjusting the pair of glasses from the initial position in 3-D space with proper pupil placement onto a 3-D model of the person's head (e.g., by aligning a center of the glasses lens with a pupil position at a vertex distance, pupil height, and IPD). The proper pupil placement may involve first determining the 3-D co-ordinates (X,Y,Z) of the person's pupil location in 3-D space from the lens measurements.

The lens measurements do not provide a single direct measurement of the 3-D co-ordinates (X,Y,Z) of the person's pupil location in 3-D space. The lens measurements may, for example, include:

LPD/RPD, which provides an indirect value of the X co-ordinate of the person's pupil location.

Pupil Height, which provides an indirect value of the Y co-ordinate of the person's pupil location.

Vertex Distance, which provides an indirect value of the Z co-ordinate of the person's pupil location.

Thus, the lens measurements include values for each of the 3-D coordinates X,Y,Z of the person's pupil location in 3-D space. However, all these values are measured relative to different reference points. The placement algorithm may combine the X, Y and Z information available in the different lens measurements to perform the pupil placements. For example, a 3-D location of the person's right pupil may be found by combining information available in the different lens measurements including right pupillary distance (RPD). pupil height, and vertex distance.

Figure 3:
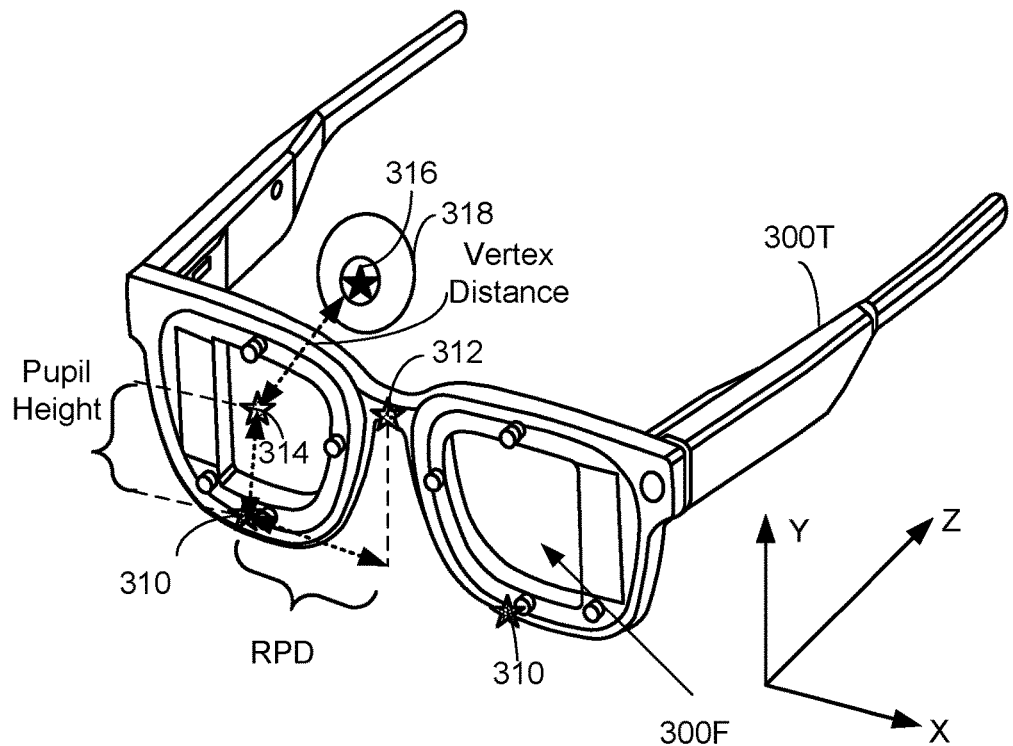
FIG. 3 illustrates a trial glasses frame.

For purposes of illustration consider FIG. 3, which shows a trial glasses frame 300 to illustrate some lens measurements, for example, LPD/RPD, pupil height and vertex distance. A front (e.g., 300F) of trial glasses frame 300 may be aligned with a x axis from right to left, and be aligned with a y axis from a top to a bottom of a lens. The temple arms 300T may extend along a z axis. In FIG. 3, stars 310 may represent bottoms of the frame, star 312 may represent a midpoint of the nose bridge of the frame, star 314 may represent the position of the pupil in the right lens, star 316 may represent the position of the pupil in the person's eyeball 318.

The placement algorithm may determine the 3-D (X, Y, Z) co-ordinates of the person's eye pupil (e.g., right eye pupil 316) by applying the lens measurement information to trial glasses frame 300. For this purpose, the placement algorithm may include the following example snippet of code.

Snippet of Code

```
# . . . Frames Loaded from previous code block
lens_x_axis, lens_y_axis,
    lens_z_axis=lens_measurement_frames.orientation
#Line represented by (point on line, line direction)
    lens_bottom_line={position: right_lens_bottom,
    direction: right_lens_bottom-left_lens_bottom}
#Plane represented by (point on plane, plane normal)
    perpendicular_lens_place={position: nose_bridge,
    normal: lens_bottom_line.direction}
#Move the line up to match the pupil height lens_bot-
    tom_line.position+=lens_y_axis*right_pupil_height
#Move the plane to the right to match rpd perpendicular_
    lens_place.position+=lens_x_axis*rpd
eye_in_lens_position=line_plane_intersection(lens_bot-
    tom_line, perpendicular_lens_place)
#Shift the eye backwards to match vertex distance
eye_in_lens_position+=lens_z_axis*vertex distance
#Done! Glasses and pupil are now aligned in 3-D to match
    the lens measurements.
```

Figure 4:
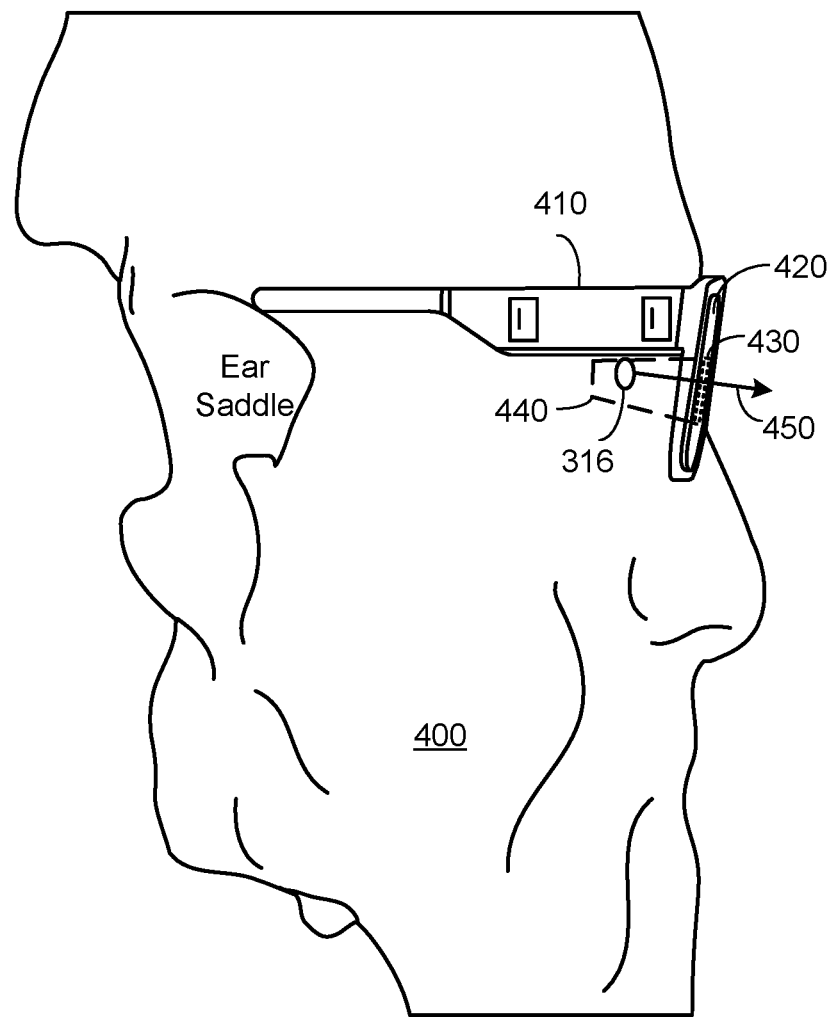
FIG. 4 illustrates a side-view of trial glasses frame.

FIG. 4 shows, for purposes of illustration, a side-view of trial glasses frame 410 placed on a 3-D model 400 of a person's head with the frame 410 and pupil 316 aligned in 3-D to match the lens measurements. Smart glasses frame 410 may include a smart display (e.g., smart display 430) in a right lens 420. Smart display 430 may have a corresponding eye box 440 for viewability of the smart display in the glasses. With the known position of pupil 316 (i.e., the known 3-D (X, Y, Z) co-ordinates of the person's right eye pupil, e.g., from FIG. 3) gazability algorithm 184 can be applied to determine the gazability of smart display 430 associated with trial glasses frame 410 (e.g., when trial glasses frame 410 is placed on the head of the person, e.g., on 3-D model 400 of the person's head).

Figure 5:
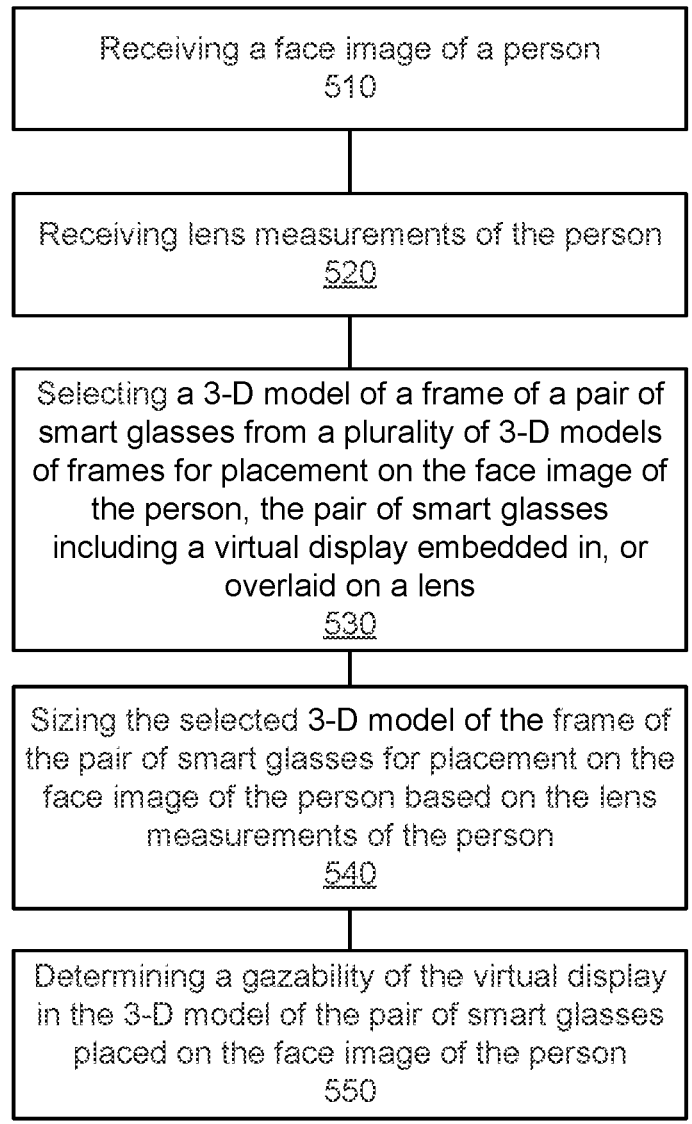
FIG. 5 illustrates an example method for remotely fitting a pair of glasses to a person.

FIG. 5 shows an example method 500 for remotely fitting a pair of glasses to a person based on optometric or lens measurements of the person. Method 500 includes receiving a face image of a person (510), receiving lens measurements of the person (520), and selecting a 3-D model of a frame of a pair of smart glasses from a plurality of 3-D models of frames for placement on the face image of the person (530). The pair of smart glasses including a virtual display embedded in, or overlaid on a lens. The method further includes sizing the selected frame of the pair of smart glasses for placement on the person based on the lens measurements of the person (540), and determining a gazability of the virtual display in the 3-D model of the pair of smart glasses placed on the face image of the person (550).

In method 500, receiving the face image of the person 510 may include receiving a frontal face image of the person wearing, for example, a sizing frame (with ArUco markers). Receiving the face image of a person 510 may include receiving the frontal face image and other side-view face images of the person captured by a camera (i.e., an image capture device) during a VTO session.

In example implementations, in method 500, the received lens measurements of the person includes one or more of the person's left pupillary distance, right pupillary distance, pupil height, pantoscopic angle, and vertex distance, the received face image of the person is a frontal face image of the person, and the selected frame is selected from a frames library, the frames library listing frames and including three dimensional (3-D) models of the frames.

Further, in method 500 sizing the selected frame of the pair of glasses for placement on the person 540 includes placing the selected frame in 3-D space on or aligned with a 3-D model of the person's head. Placing the selected frame in 3-D space on or aligned with the 3-D model of the person's head includes determining a 3-D location of the person's pupil by combining information available in different lens measurements including right pupillary distance (RPD), pupil height, and vertex distance. Further, sizing the selected frame of the pair of smart glasses for placement on the person based on the lens measurements of the person 540 can include detecting features on the face and comparing with the virtual placement to see if the width of the glasses fits the width of the person's head.

In example implementations, sizing the selected frame of the pair of glasses for placement on the person may avoid use of a 3D glasses model and instead involve placing a 2-D rendering of the selected frame a 2-D face image.

In method 500, determining gazability of the virtual display, may include adjusting a gaze of the pupil to each corner of the virtual display and determining what percentage of the display light is entering the pupil.

Glasses Placement Based on Lens Measurements

In example implementations, a virtual try-on system (e.g., VTO system 600) may be coupled to, or combined with, an image processing system (e.g. image processing system 100). For convenience in description, the coupled or combined systems may be referred to alternatively as the image processing system or the VTO system.

The VTO system may display virtual trial pairs of glasses positioned on the person's face in computer images that the person can inspect, for example, for appearance, as the person turns or tilts or turns his or her head from side to side. In other words, the VTO system, in addition to displaying a trial pair of glasses on a front-view face image (e.g., frontal face image 200A, FIG. 2A) may be configured to display the trial pair of glasses positioned on side-view images (e.g., side-view face images 200B and 200C, FIGS. 2B and 2C) of the person's face.

Both the front-view face images and the side-view face images (e.g. image 60) may be received by image processing system 100 for processing (FIG. 1). In example implementations, the front-view face images and the side-view face images may be captured by a camera (e.g., a smart phone) operated by a third party or by the person himself or herself (e.g., as selfies) in a VTO session.

In example implementations, the VTO system may be configured to place glasses in 3-D based on the person's lens measurements on side-view images of the person's face (e.g., on an arbitrarily oriented 2-D image of the face, side-view face images 200B and 200C, FIGS. 2B and 2C). The VTO system may first place the glasses in 3-D on a front-view face image (e.g., frontal face image 200A, FIG. 2A). The VTO system may place the glasses in 3-D at an initial position in a 3-D model space, and then move or align the glasses for placement on the front-view face image based on the person's lens measurements (e.g., as discussed above with reference to FIG. 3). Next, the VTO system may further scale or transform in size, and move or rotate, the glasses in 3-D space to match the position and orientation of the person's face in the side-view face images before placing the glasses on the side-view images for display.

For these example implementations, a "glasses model space ($G_P$)" may be defined to correspond to a scenario in which the person's face is completely parallel with the camera image plane (or perpendicular to the camera's line of sight) and the person's eyes are looking straight ahead (e.g., toward the horizon or infinity). FIG. 2A shows, for example, an image (e.g., frontal face image 200A) corresponding to the "glasses model space" with the person looking straight ahead.

Further, a "face space ($F_P$)" may be defined to correspond to a current position and orientation of the person's face in a given side-view image. A given 2-D image in face space ($F_P$) may correspond to a scenario where the person's face is, for example, tilted or rotated to the left or right. FIGS. 2B and 2C show, for example, images (e.g., non-frontal images 200B and 200C) in the face space ($F_P$) with the person's face turned to the left or right.

The 3-D orientation of a face space image can be determined using a feature detection pipeline in the VTO system. However, determination of the 3-D position in face space ($F_P$) further requires pupil detection and gaze correction (e.g., to adjust the pupils to look forward and to adjust or scale for the apparent smaller IPD in side-view face images).

In an example implementations, distances may be measured in units of millimeters (mm) and positions may be measured in units of pixels (px).

In an example implementations, an example algorithm for determining the 3-D positions of the pupils in a face space ($F_P$) image may include the following steps:
(1) determining a face orientation
(2) determining pupil positions P1, P2 in the image
(3) assuming a gaze point as either looking forward or looking toward a camera center (in other words, a gaze point may be adjusted depending on context, e.g., whether the person was told to look at a gaze point or look straight ahead, or look at the camera or the screen); and
(4) determining a depth of the pupils (from the camera) using the pupil positions P1, P2 (px) and the known lens measurement IPD.

Determining the depth of the pupils (at step 4 above) may include determining the pupil depth d by the equation:

$$d = M*F/(\text{norm}(P1-P2)),$$

where F is the camera focal length F, P1 and P2 are the known 2-D image positions of the pupils, and M is a known IPD value (known from the lens measurement).

The example algorithm for determining the 3-D positions of the pupils in face space ($F_P$) may further include:
(5) determining the 3-D positions of the pupils in face space ($F_P$) as P1, P2+d After the face space ($F_P$) and glasses model space ($G_P$) are defined, points (e.g., object co-ordinates) in $G_P$ may be mapped or transformed to points in $F_P$ by a transform function.

In example implementations, the transform function may be determined as follows: The orientation of $G_P$ may be assumed to be a symmetric conical face space (i.e., a left-right symmetric space). The orientation of $F_P$ (angles of the face) are measured relative to the conical face space. A rotation matrix R may represent the orientation of $F_P$. By construction, the orientation of $G_P$ is the identity matrix I. Thus, to align $G_P$ to $F_P$ (I→R), $G_P$ is rotated by R, i.e., R($G_P$). Alignment of the positions/origins of $G_P$ and $F_P$ can be based on the fact that the 3-D position of the pupils $P_L$ and $P_R$ are known in both spaces ($P_{GL}$, $P_{GR}$, $P_{FL}$, $P_{FR}$). Using this fact to translate from $G_P$ to $F_P$ requires adding (($P_{GL}-P_{FL}$)+($P_{GR}-P_{FR}$))/2 to the points in $G_P$.

Once the orientation and origins of the two spaces match, the two spaces $G_P$ to $F_P$ are aligned and have the glasses in a 3-D position in face space.

Figure 6:
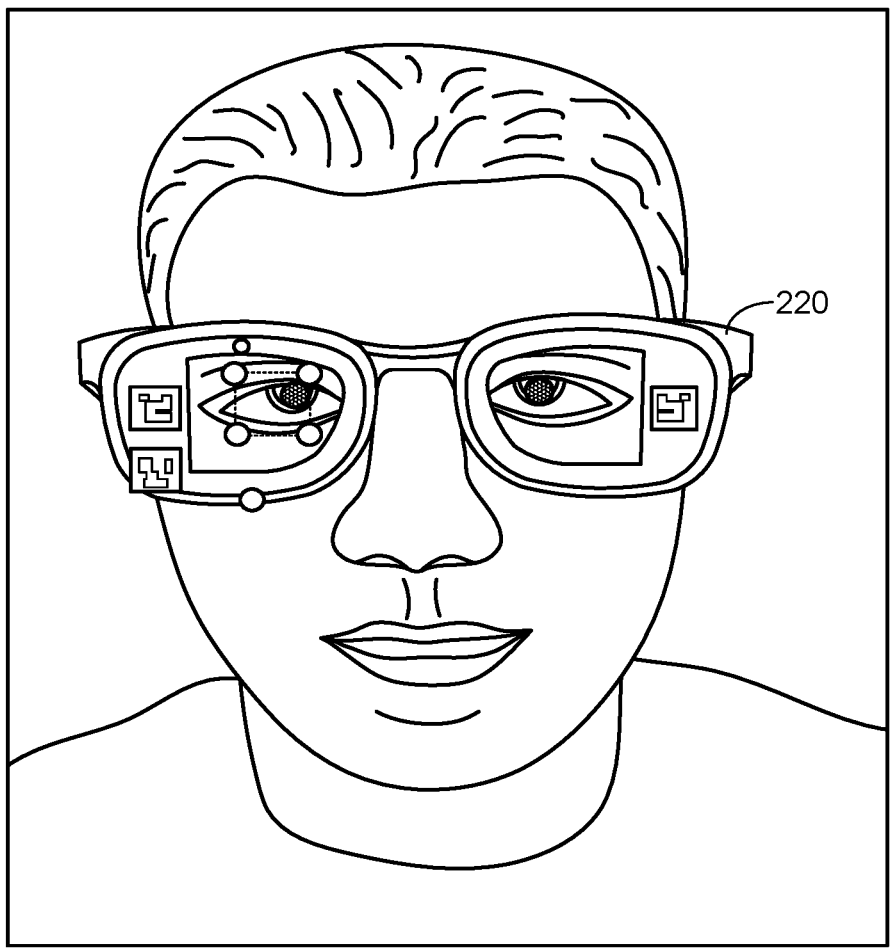
FIG. 6 illustrates a face space image rotated into alignment with a glasses model space.

FIG. 6, shows, for example, a face space image 650 rotated into alignment with the glasses model space ($G_P$) (e.g., frontal face image 200A of a person 210 wearing glasses 220), and shows placement of glasses 220 in face space $F_P$ aligned with glasses model space $G_P$. Comparison of the positions of the ArUco markers on glasses 220 in FIG. 6 with the positions of the ArUco markers on glasses 220 in FIG. 2A may represent the small errors (not shown) in placement that may be caused by the rotation of face space $F_P$ to align with glasses model space $G_P$.

Figure 7:
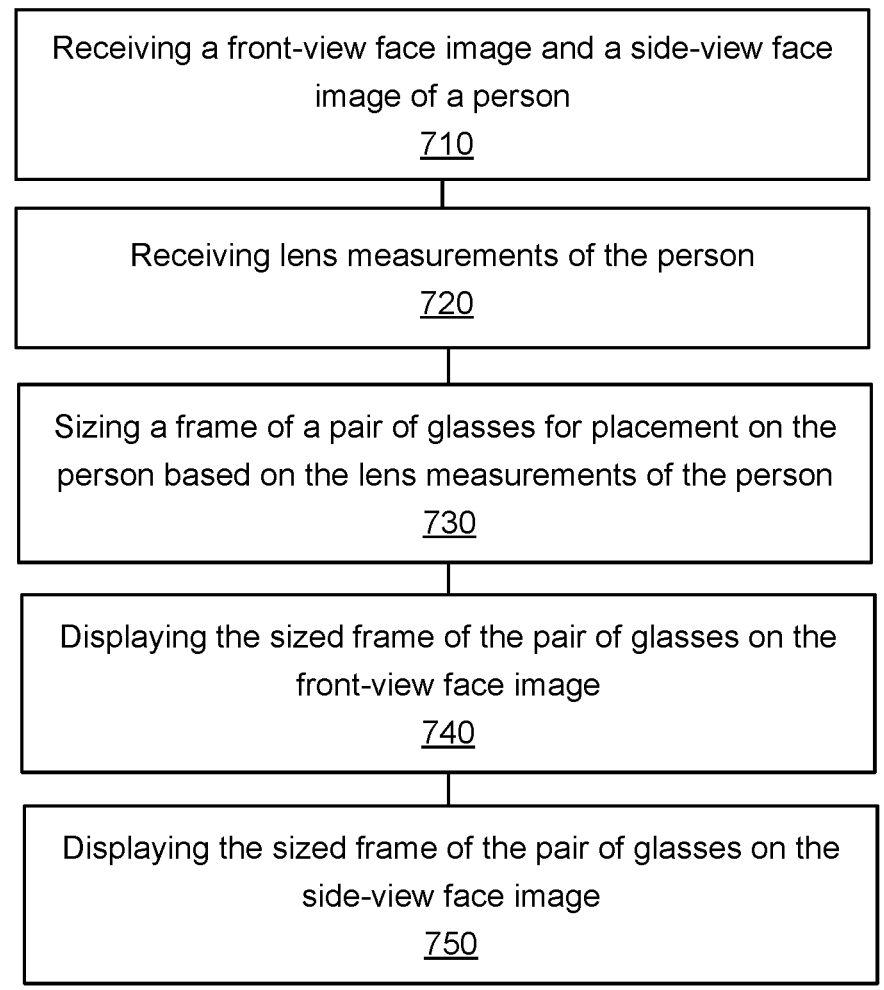
FIG. 7 illustrates an example method for remotely fitting a pair of glasses to a person including displaying trial fitted glasses on 2-D face images of the person.

FIG. 7 shows an example method 500 for remotely fitting a pair of glasses to a person based on optometric or lens measurements of the person. Method 700 can be used to display trial fitted glasses on 2-D face images of the person.

Method 700 includes receiving a front-view face image and a side-view face image of the person (710), receiving lens measurements of the person (720), and sizing a frame of the pair of glasses for placement on the person based on the lens measurements of the person (730). Method 700 further includes displaying the sized frame of the pair of glasses on the front-view face image (740), and displaying the sized frame of the pair of glasses on the side-view face image (750).

In method 700, displaying the sized frame of the pair of glasses on the front-view face image 740 includes first placing the glasses in 3-D in a 3-D model space at an initial position and aligning the glasses for placement on the front-view face image based on the person's lens measurements.

The method further includes moving or rotating the glasses in 3-D model space to match a position and orientation of the person's face in the side-view face image before placing the glasses on the side-view image for display. Moving or rotating the glasses in 3-D model space to match the position and orientation of the person's face in the side-view face image can include determining the 3-D positions of the pupils in the side-view face image and scaling or adjusting a size of the glasses for placement on the side-view face image based on the person's lens measurements.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations can be performed in parallel, concurrently or simultaneously. In addition, the order of operations can be re-arranged. The processes can be terminated when their operations are completed, but may also have additional steps not included in the figure. The processes may correspond to methods, functions, procedures, subroutines, subprograms, etc.

Methods discussed above, some of which are illustrated by the flow charts, can be implemented by hardware, software, firmware, middleware, microcode, hardware description languages, or any combination thereof. When implemented in software, firmware, middleware or microcode, the program code or code segments to perform the necessary tasks can be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements can be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that can be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium can be magnetic (e.g., a floppy disk or a hard drive) or optical (e.g., a compact disk read only memory, or CD ROM), and can be read only or random access. Similarly, the transmission medium can be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:
1. An image processing system, comprising:
a processor;
a memory; and
the processor being configured to execute instructions stored in memory to:

receive a face image of a person;
receive lens measurements of the person;
select a model of a frame of a pair of smart glasses from a plurality of models of frames for placement on the face image of the person, the pair of smart glasses including a display embedded in, or overlaid on a lens of the pair of smart glasses;
size the selected model of the frame of the pair of smart glasses for placement on the face image of the person based on the lens measurements; and
determine a gazability measure of the display by adjusting a gaze of a pupil of the person to each corner of the display and determining how much light transmitted through the display enters the pupil.

2. The image processing system of claim 1, wherein the received lens measurements include one or more of a left pupillary distance, right pupillary distance, pupil height, pantoscopic angle, and vertex distance.

3. The image processing system of claim 1, wherein the received face image of the person is a frontal face image of the person.

4. The image processing system of claim 1, further comprising, a frames library including the plurality of the models of the frames, and wherein the selected model of the frame is selected from the frames library.

5. The image processing system of claim 1, wherein sizing the selected model of the frame of the pair of smart glasses for placement on the person includes placing the selected model of the frame in 3-D space on or aligned with a 3-D model of a head of the person.

6. The image processing system of claim 5, wherein placing the selected frame in 3-D space on or aligned with the 3-D model of the head of the person includes determining a location of a right pupil of the person by combining information available in the lens measurements including right pupillary distance (RPD), pupil height, and vertex distance.

7. The image processing system of claim 1, wherein the processor is configured to execute instructions stored in memory to further receive side-view face images of the person, and align and place the sized model of the frame of the pair of smart glasses on the side-view face images of the person.

8. A method, comprising:
receiving a face image of a person;
receiving lens measurements of the person;
selecting a model of a frame of a pair of smart glasses from a plurality of models of frames for placement on the face image of the person, the pair of smart glasses including a display embedded in, or overlaid on a lens of the pair of smart glasses;
sizing the selected model of the frame of the pair of smart glasses for placement on the face image of person based on the lens measurements; and
determining a gazability measure of the display by adjusting a gaze of a pupil of the person to each corner of the display and determining how much of a light transmitted through the display is entering the pupil.

9. The method of claim 8, wherein the received lens measurements include one or more of a left pupillary distance, a right pupillary distance, a pupil height, a pantoscopic angle, and a vertex distance.

10. The method of claim 8, wherein the received face image of the person is a frontal face image of the person.

11. The method of claim 8, wherein the selected model of the frame is selected from a frames library, the frames library including the plurality of the models of the frames.

12. The method of claim 8, wherein sizing the selected model of the frame of the pair of smart glasses for placement on the person includes placing the selected model of the frame in 3-D space on or aligned with a 3-D model of a head of the person.

13. The method of claim 12, wherein placing the selected model of the frame in 3-D space on or aligned with the 3-D model of the head of the person includes determining a location of a pupil of the person by combining information available in the lens measurements including a right pupillary distance (RPD), a pupil height, and a vertex distance.

14. The method of claim 8, wherein determining gazability of the display includes conducting mathematical operations based on the lens measurements to position a pupil of the person within an eye box, and then adjusting a gaze of the pupil to each corner of the display and determining how much of a display light is entering the pupil.

15. The method of claim 14, wherein receiving the face image of a person includes receiving side-view face images of the person, and aligning and placing the sized model of the frame of the pair of smart glasses on the side-view face images of the person.

16. A non-transitory computer-readable medium storing executable instructions that when executed by at least one processor are configured to cause the at least one processor to:
receive a face image of a person;
receive lens measurements of the person;
select a model of a frame of a pair of smart glasses from a plurality of models of frames for placement on the face image of the person, the pair of smart glasses including a display embedded in, or overlaid on a lens of the pair of smart glasses;
size the selected model of the frame of the pair of smart glasses for placement on the face image of person based on the lens measurements; and
determine a gazability measure of the display by adjusting a gaze of a pupil of the person to each corner of the display and determining how much of a light transmitted through the display is entering the pupil.

17. The non-transitory computer-readable medium of claim 16, wherein the received lens measurements include one or more of a left pupillary distance, a tight pupillary distance, a pupil height, a pantoscopic angle, and a vertex distance.

18. The non-transitory computer-readable medium of claim 16, wherein the received face image of the person is a frontal face image of the person.

19. The non-transitory computer-readable medium of claim 16, wherein the selected model of the frame is selected from a frames library, the frames library including the plurality of the models of the frames.

20. The non-transitory computer-readable medium of claim 16, wherein sizing the selected model of the frame of the pair of smart glasses for placement on the face image of the person includes placing the selected model of the frame in 3-D space on or aligned with a 3-D model of a head of the person.

21. The non-transitory computer-readable medium of claim 20, wherein placing the selected model of the frame in 3-D space on or aligned with the 3-D model of the head of the person includes determining a location of a pupil of the person by combining information available in the lens measurements including a right pupillary distance (RPD), a pupil height, and a vertex distance.

22. The non-transitory computer-readable medium of claim 16, wherein receiving the face image of a person includes receiving side-view face images of the person, and aligning and placing the sized model of the frame of the pair of smart glasses on the side-view face images of the person.

\* \* \* \* \*

UNITED STATES PATENT AND TRADEMARK OFFICE
CERTIFICATE OF CORRECTION

| | | |
|---|---|---|
| PATENT NO. | : 12,008,711 B2 | Page 1 of 1 |
| APPLICATION NO. | : 17/650453 | |
| DATED | : June 11, 2024 | |
| INVENTOR(S) | : Aleem et al. | |

It is certified that error appears in the above-identified patent and that said Letters Patent is hereby corrected as shown below:

In the Claims

In Column 16, Claim 17, Line 43, delete "tight" and insert -- right --, therefor.

Signed and Sealed this
Fifth Day of November, 2024

Katherine Kelly Vidal
*Director of the United States Patent and Trademark Office*